(12) United States Patent
Cohen et al.

(10) Patent No.: US 6,482,343 B1
(45) Date of Patent: Nov. 19, 2002

(54) POLYMERIC MATERIALS AND PROCESS FOR PRODUCING SAME

(75) Inventors: Yachin Cohen, Haifa (IL); Dmitry M. Rein, Nesher (IL); Lev Vaykhansky, Haifa (IL)

(73) Assignee: Polyeitan Composites Ltd., Nesher (IL)

( * ) Notice: Subject to any disclaimer, the term of this patent is extended or adjusted under 35 U.S.C. 154(b) by 0 days.

(21) Appl. No.: 09/424,643

(22) PCT Filed: Jun. 28, 1999

(86) PCT No.: PCT/US99/14563

§ 371 (c)(1),
(2), (4) Date: Nov. 26, 1999

(87) PCT Pub. No.: WO00/00334

PCT Pub. Date: Jan. 6, 2000

(51) Int. Cl.[7] .......................... B29C 43/14; B29C 43/52

(52) U.S. Cl. ....................... 264/120; 264/134; 264/125; 264/322; 264/128; 429/198; 429/304.4

(58) Field of Search ................................. 264/109, 112, 264/120, 125, 126, 128, 134, 135, 257, 319, 322, 496; 442/409; 428/198, 304.4

(56) References Cited

U.S. PATENT DOCUMENTS

| 5,244,617 A | * | 9/1993 | Murphy et al. ............. 264/120 |
| 5,573,824 A | * | 11/1996 | Klocek et al. ................ 428/38 |
| 5,628,946 A | * | 5/1997 | Ward et al. .................. 264/120 |
| 5,879,607 A | * | 3/1999 | Klocek et al. ............... 264/231 |

* cited by examiner

Primary Examiner—Angela Ortiz
(74) Attorney, Agent, or Firm—Mark M. Friedman

(57) ABSTRACT

An improved process for producing a consolidated polymeric monolith from an assembly of thermoplastic polymer. The assembly is placed under pressure to fill a majority of the voids thereof by mechanical deformation of the fibers, and heated to a temperature too low to melt the fibers at the deformation pressure but sufficiently high to at least partly melt the fibers at a lower transition pressure. While maintaining the assembly at this temperature, the pressure is reduced to the transition pressure long enough for partial melting of the fibers to fill the rest of the voids, and then is increased to a consolidation pressure at least as high as the deformation pressure. The assembly is cooled slowly to ambient temperature at the consolidation pressure. The process allows accurate control of thermal expansion coefficients of the product. Further, products of manufacture produced by the process exhibit improved strength, thermal stability, infrared transparency and unique intrinsic physical characteristics.

59 Claims, 15 Drawing Sheets

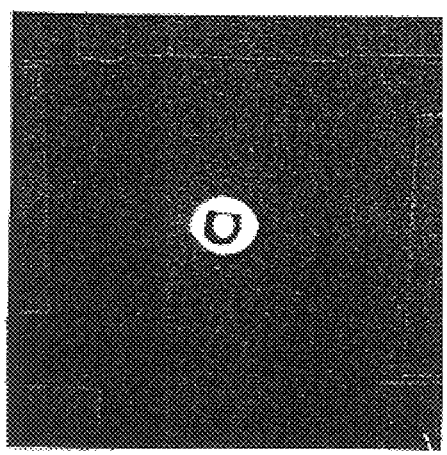 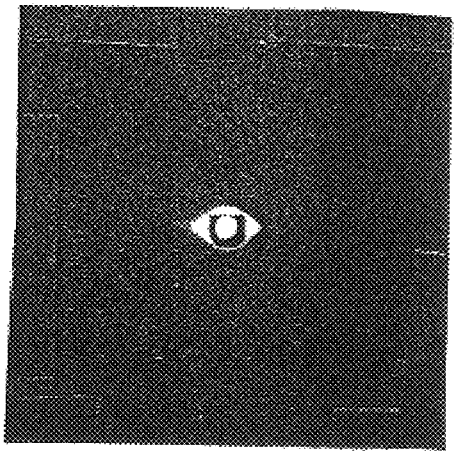
FIG. 14c              FIG. 15b
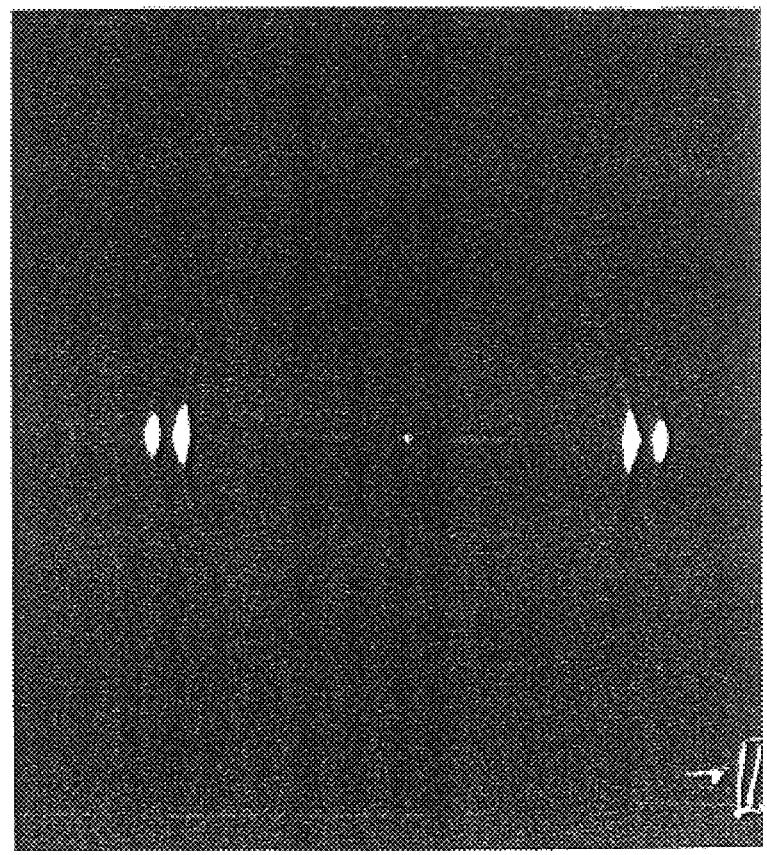
FIG. 15a

POLYMERIC MATERIALS AND PROCESS FOR PRODUCING SAME

FIELD AND BACKGROUND OF THE INVENTION

The present invention relates to polymeric materials and further to a process for the production of polymeric materials.

Rein et al., in PCT Application No. WO 97/11037, which is incorporated by reference for all purposes as if fully set forth herein, describe a process for producing a polyolefin composite material from an assembly of polyolefin fibers by treating the assembly with a solvent such as xylene, or with a solution of the polyolefin, to swell the surficial layers of the fibers, growing and crystallizing "brush layers" on the fiber surfaces, and then heating and compressing the fibers. Preferably, the fibers are first placed under tension, the swelling of the surficial layers is effected at a temperature greater than that needed to melt the unloaded fibers but less than that needed to melt the loaded fibers, and the brush layers are grown and crystallized at a lower temperature.

Harpell et al., in European Patent Application 0 116 845, describe a process for transforming a network of high molecular weight polyethylene fibers into polyethylene articles, by the simultaneous application of a temperature between 100° C. and 160° C. and high pressure. The pressure is applied long enough to attain the desired degree of fiber coalescence, from simply causing adjacent fibers to adhere, to obtaining a film-like article which is substantially free of voids.

Ward et al., in U.S. Pat. No. 5,628,946, which is incorporated by reference for all purposes as if fully set forth herein, describe a process for producing a polymer sheet. An assembly of oriented polymer fibers is compressed at a contact pressure sufficient to hold the fibers in mutual intimate contact and then heated to a temperature sufficient to induce partial melting of the fibers. The melt fills the voids between the fibers. The assembly then is maintained at that temperature while being compressed at a still higher pressure to form the final product. In some cases, for example when the polymer fibers are made of highly oriented gel spun polyethylene, there is a tradeoff in the final product between high strength in the direction of fiber alignment, obtained by only limited partial melting, and high strength transverse to the direction of fiber alignment, obtained by more extensive partial melting.

Klocek et al., in U.S. Pat. Nos. 5,879,607 and 5,573.824 describe a method of making a protective coating material and the resultant high strength, high modulus continuous polymeric material for durable, impact resistant applications material. This method requires the use of overlapping layers of sinusoidal strands which results in relatively thick sheets.

SUMMARY OF THE INVENTION

According to the present invention there is provided a process for the production of a consolidated polymeric monolith from a thermoplastic polymer, the process including the steps of (a) forming an assembly of a thermoplastic polymer; (b) applying a pressure to the assembly sufficient to deform the polymer to substantially fill a majority of voids in the assembly, the assembly having a melting temperature at the deformation pressure; (c) heating the assembly to a temperature below the melting temperature but at which the assembly would at least partly melt at a transition pressure lower than the deformation pressure; and (d) subsequently reducing the applied pressure to the transition pressure while maintaining the assembly at the temperature for a time sufficient for the assembly to at least partly melt, thereby substantially filling a remainder of the voids.

It has been discovered that the process taught by Rein et al. in WO 97/11037 can be implemented with excellent results without preloading the fibers, provided that the assembly of solvent-treated or solution-treated fibers is compressed to a deformation pressure sufficiently high to fill most of the voids of the assembly by mechanically deforming the fibers. While under this deformation pressure, the assembly is heated to a temperature that is too low to melt the fibers while they are maintained at the deformation pressure, but that is high enough to at least partly melt the fibers at a lower pressure, referred to herein as the transition pressure. The assembly is maintained at this temperature, and the pressure is reduced to the transition pressure long enough to induce sufficient partial melting to substantially complete the filling of the voids but not long enough to impair the mechanical strength of the final product. Finally, the pressure on the assembly is increased to a consolidation pressure at least as great as the deformation pressure, in order to stop the melting, and the assembly is cooled to the ambient temperature at the consolidation pressure. If necessary, the cycling through transition pressure and consolidation pressure is repeated one or more times, at a frequency between 0.001 Hz and 0.5 Hz. The swelling of the fibers continues, albeit at slower rate, during the application of pressure and heat to the assembly of solvent-treated or solution-treated fibers. furthermore, it has been found that it is not necessary to add solvent to the fiber assembly, as taught by Rein et al. The residual solvent and/or lubricant left over on the polyolefin fibers after the manufacture of these fibers and/or weaving of the fiberbased cloths is sufficient to initiate the desired fiber consolidation. This residual solvent and/or lubricant generally constitutes less than 2% of the fiber assembly by weight.

Unlike the process taught by Ward et al., the present invention is applicable to both oriented and unoriented fiber assemblies. Furthermore, the present invention is also suited to use with polymer in non-fiber forms, including, but not limited to, powder, beads, tape chips and discs.

The present invention allows more precise control of conditions within the assembly than the process taught by Ward et al. The heat applied to the assembly is necessarily applied from outside of the assembly. As a result, the temperature field inside the assembly is inhomogeneous, at least initially, and different portions of the assembly undergo different degrees of partial melting. According to the present invention, the assembly is first subject to pressure and heat without melting, and then the pressure is released to induce the partial melting. Because the pressure change is propagated throughout the assembly essentially instantaneously, while the temperature field in the assembly is homogeneous, the partial melting of the assembly is induced uniformly, without any limitation on the thickness of the assembly.

Unlike the process taught by Ward et. al., the present invention makes use of straight fibers arranged in overlapping layers which may be at any angle to one another. This process allows production of plastic sheets with a minimum thickness approaching the fiber filament diameter, a significant improvement over "overlapped sinusoidal strands" based products produced by following the teachings of Klocek et al. This improvement is especially important in infrared sensing applications and high frequency dielectric material applications where both strength and thinness are required.

The scope of the present invention also includes articles of manufacture made by the process of the present invention.

According to preferred embodiments of the present invention, these articles of manufacture, in the form of polymeric monoliths are characterized by a density greater than that available using methods taught by the prior art. This density is an indication of strength so that the present invention represents an important improvement over the prior art.

According to preferred embodiments of the present invention, the polymeric monoliths are further characterized by super-oriented needlelike voids.

According to preferred embodiments of the present invention, the polymeric monoliths are further characterized by a high level of matrix orientation.

According to further features of preferred embodiments, the aforesaid articles of manufacture exhibit more than 70% transmission of most wavelengths between 2 and 12 micrometers, a quality which is critical for many optical sensor applications.

According to additional further features of the present invention, the aforesaid articles of manufacture are characterized by a low thermal expansion coefficient.

According to still further additional further features of the present invention, the aforesaid articles of manufacture are characterized by predetermined thermal expansion coefficients for each of the three axes X, Y, and Z.

According to still further features of the present invention, the aforesaid articles of manufacture bond not less strongly to one another when welded or dissolved together than when bonded with a strong polar glue, such as epoxy.

According to still further features of the present invention, the aforesaid articles of manufacture bond not less strongly to other surfaces, for example a metal, when welded or dissolved thereon than when bonded with a strong polar glue, such as epoxy.

The range of articles of manufacture included in the present invention, and produced by the process of the present invention, have significant advantages over those produced according to prior art teachings with respect to a wide range of applications, including, but not limited to, ballistic protection, radomes for communications antennae, electronic circuit boards, medical X-ray imaging applications, orthopedic implants, and membranes for industrial waste processing.

BRIEF DESCRIPTION OF THE DRAWINGS

The invention is herein described, by way of example only, with reference to the accompanying drawings, wherein:

FIGS. 14a–c show wide angle (a, b) and small angle (c) X-ray diffraction patterns generated from two specific embodiments of the present invention expressly produced to have a thermal expansion coefficients (TEC) of 17×10⁻⁶° $C.^{-1}$ (a) or −9×10⁻⁶° $C.^{-1}$ (b) (isotropic planar [in X and Y axes]) and 70×10⁻⁶° $C.^{-1}$ with respect to the Z axis. Sample is analyzed in (a) was produced by the method of example 10. Sample analyzed in (b) was produced by the method of example 11. Small angle diffraction pattern (c) is identical for both samples.

FIGS. 15a–b show wide angle (a) and small angle (b) X-ray diffraction patterns generated from a sample produced by the method of example 18, expressly produced to have a thermal expansion coefficients (TEC) of −3×10⁻⁶° $C.^{-1}$with respect to the X axis, 45×10⁻⁶° $C.^{-1}$ with respect to the Y axis and 60×10⁻⁶° $C.^{-1}$ with respect to the Z axis (unidirectional TEC).

DESCRIPTION OF THE PREFERRED EMBODIMENTS

The present invention is of an improved process for the production of consolidated polymer monoliths and further of novel polymer monoliths produced thereby.

The principles and operation of consolidated polymer monolith production according to the present invention may be better understood with reference to the accompanying description.

The assembly of polymeric fibers or other polymeric forms to be processed by the present invention may be oriented, in a variety of orientations. In particular, polymeric fibers according to the present invention may be arranged as a uniaxially aligned bundle or a twisted bundle of fibers, or as an assembly of chopped fibers, or as a mat of interwoven bundles, or is a mat formed by layering bundles of fibers so that the bundles in successive layers are aligned at an angle to each other, e.g., perpendicular to each other. The bundles may be assembled and pressed into any convenient shape. The ultimate products may include, inter alia, flat sheets, rods, and bars, and also a variety of curved articles of manufacture.

Assemblies of polymeric powder, beads, discs and chips for processing is inherently random. Assembly of polymeric tape may be either arranged as described herein above for fibers, or arranged randomly within the production apparatus.

The process of the present invention may utilize any polymer which can be selectively melted. The susceptibility of particular polymers and particular grades of those polymers to selective melting varies, and their suitability for use in the process of this invention may be determined empirically. The present invention finds particular application in the production of polyolefin articles, especially polyethylene articles. Other classes of polymers to which the present invention is applicable include unsubstituted or mono- or poly-halo- substituted vinyl polymers, unsubstituted or hydroxy-substituted polyesters, polyamides, polyethers, polyetherketones, and polyacetals.

Figure 1:
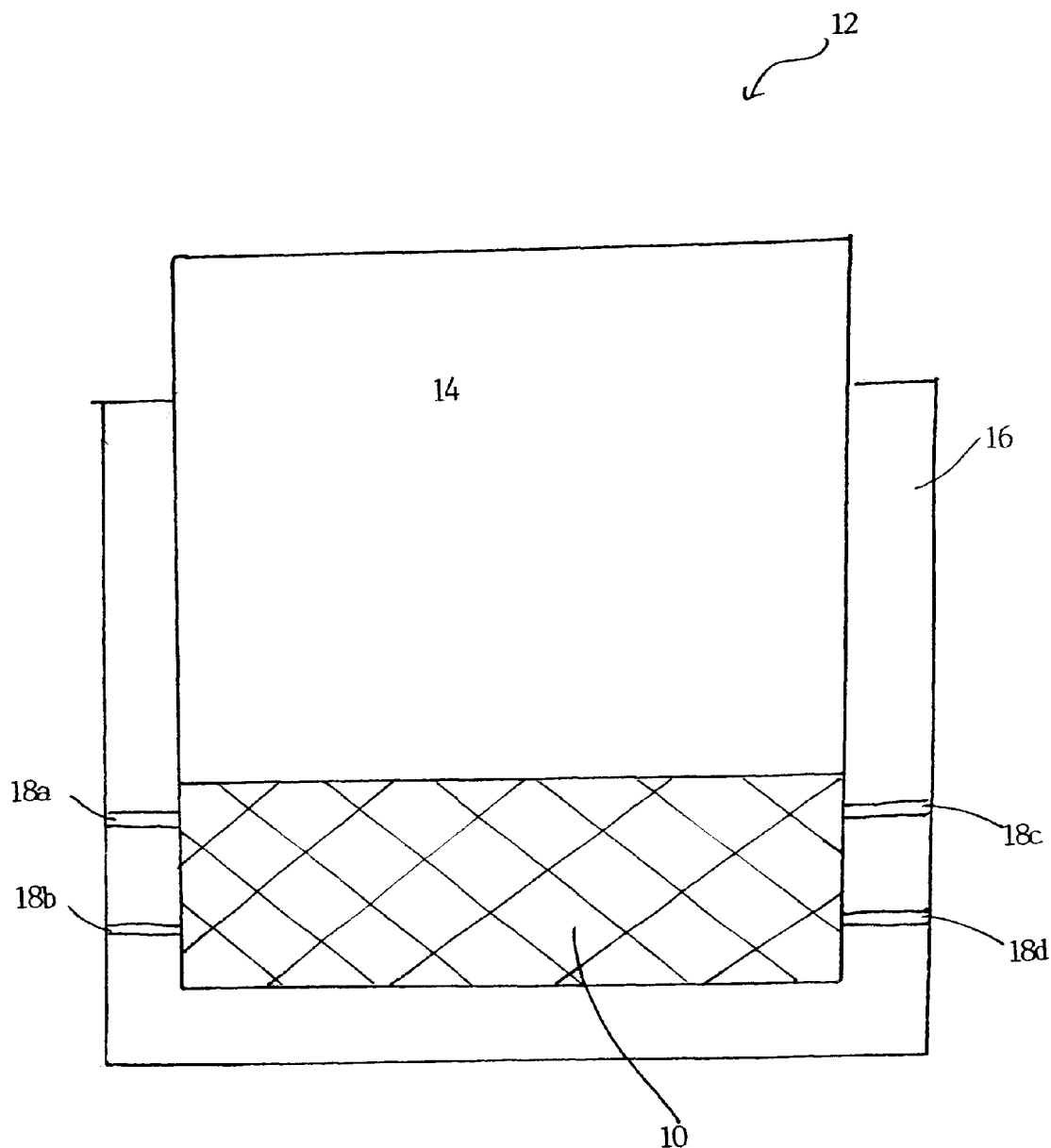
FIG. 1 illustrates the simultaneous application of uniaxial pressure and vacuum to a fiber assembly.

It is preferable to apply vacuum to the assembly to remove air from the assembly. FIG. 1 shows one method of simultaneously applying vacuum and uniaxial pressure. An oriented fiber assembly 10 is compressed in a vacuum press mold 12, between a piston 14 and a matrix 16. Compression is applied using a standard hydraulic press. During this compression, vacuum is applied to ports 18a, 18b, 18c and 18d in matrix 16. Assembly 10 is shown in FIG. 1 at its initial thickness. At the end of compression, when assembly 10 has reached its final thickness, the contact between assembly 10 and piston 14 is just below ports 18b and 18d. Suitable vacuum press molds include the KBr Die Model 129 available from Spectra-Tech Inc. of Shelton CT.

Figure 2:
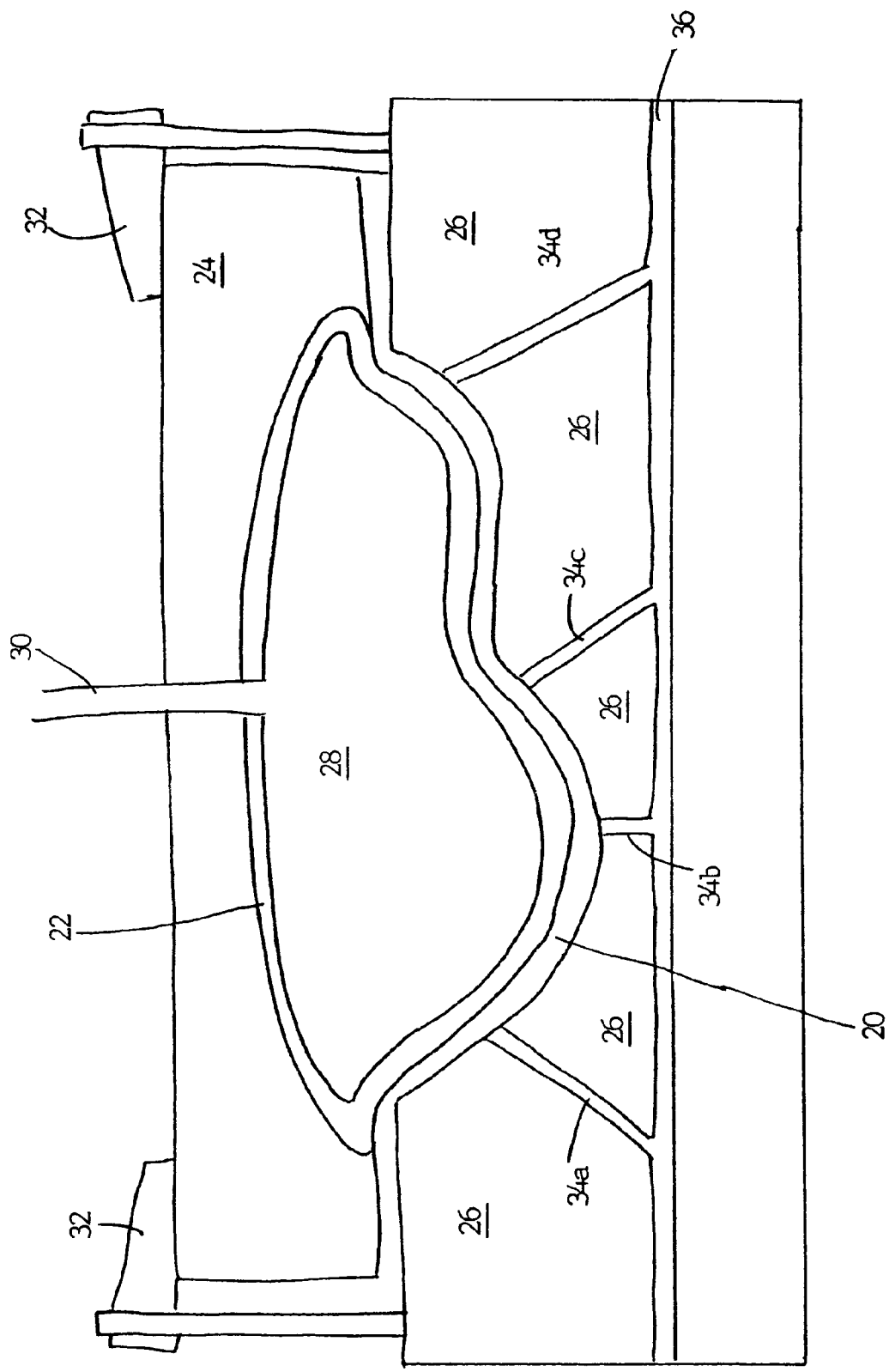
FIG. 2 illustrates the simultaneous application of triaxial pressure and vacuum to a fiber assembly.
Figure 3A:
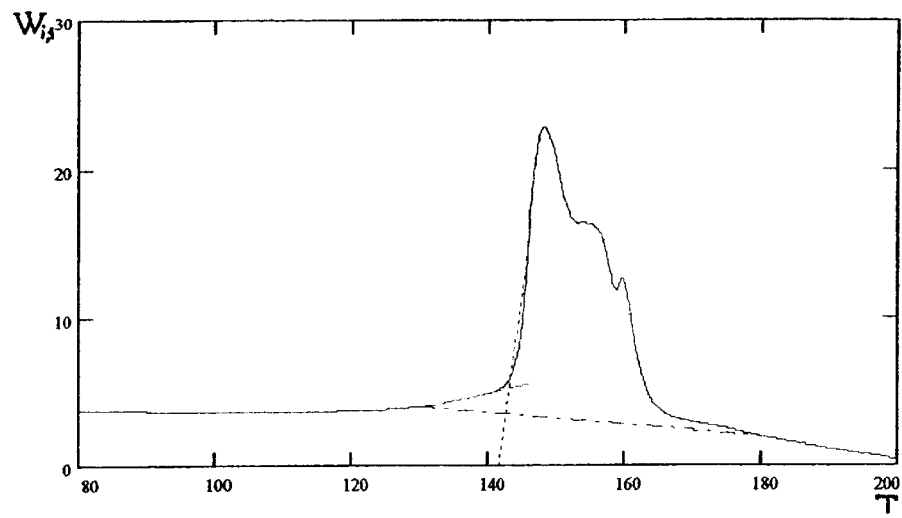
FIGS. 3a–c show typical differential scanning calorimetry (DSC) thermograms of polyethylene fibers (a), composite Pe2 produced by the method described in Example 5 hereinbelow (b) and melting enthalpy of the matrix material part of the composite [derived by subtracting (a) from (b)] (c). $W_{i1}$=enthalpy (J); T=temperature (° C.).
Figure 3B:
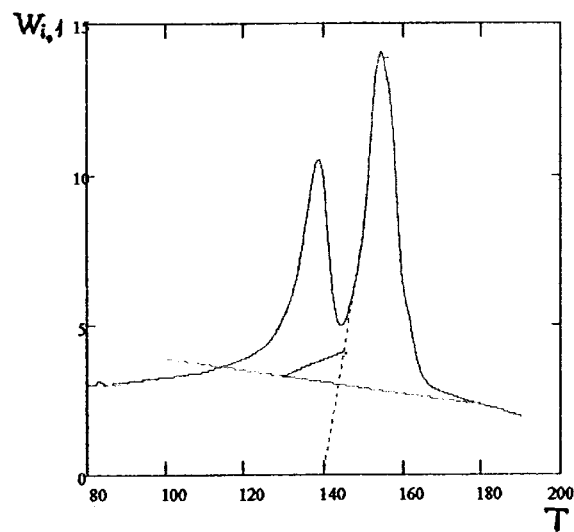
Figure 3C:
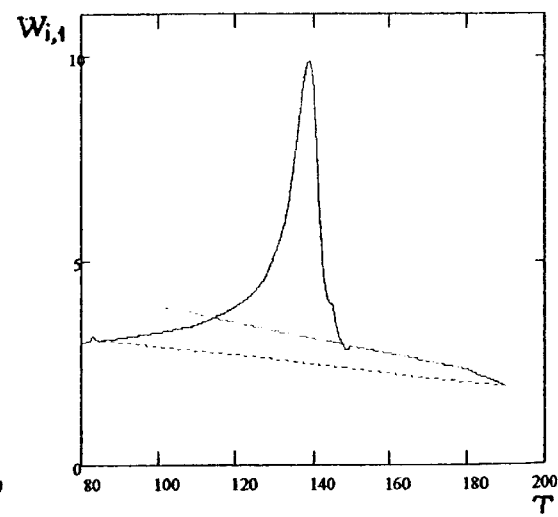
Figure 4A:
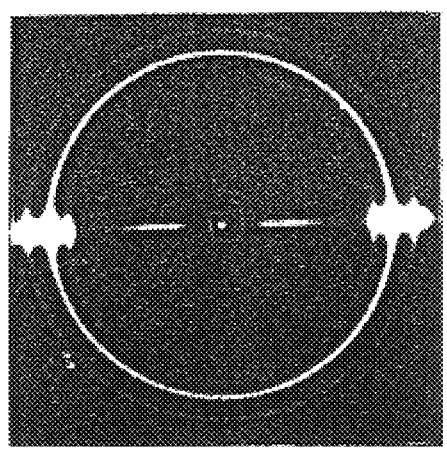
FIGS. 4a–c show wide angle X-Ray diffraction patterns from composite Pe1 (a), Pe2 (b) and PE fiber (c). Conditions of manufacture for Pe1 and Pe2 are disclosed in examples 25 and 24, respectively.
Figure 4B:
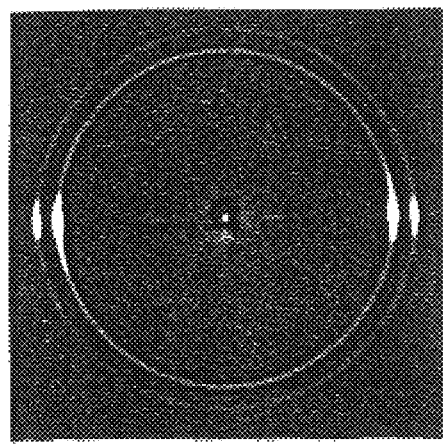
Figure 4C:
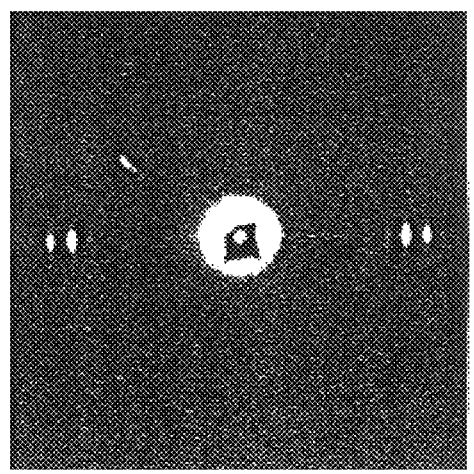
Figure 5:
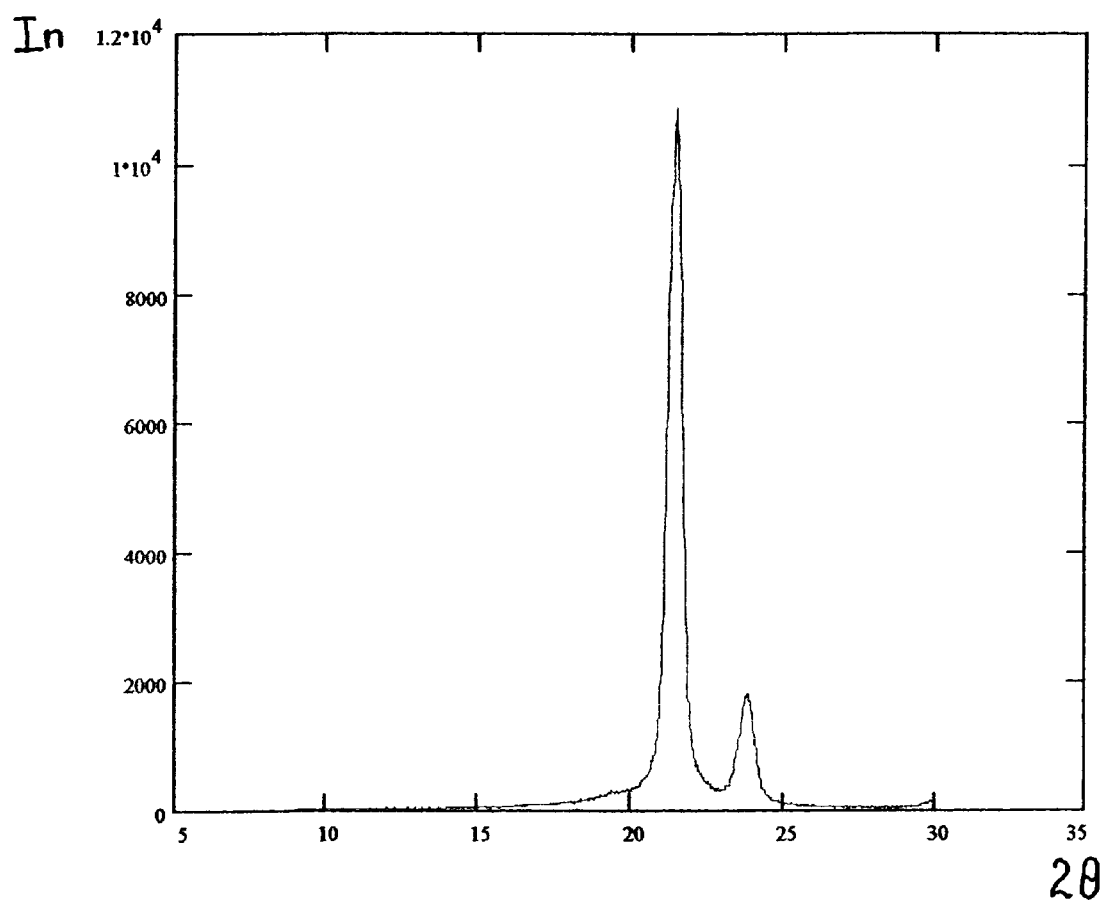
FIG. 5 is a transmission recording of an X-Ray diffractogram of a Pe1 sample. The crystal plane which is perpendicular to the sample plane is in the reflection position. In=intensity in photon number per second in absolute units as registered by the device; Q=2θ (Bragg's angle in degrees).
Figure 6:
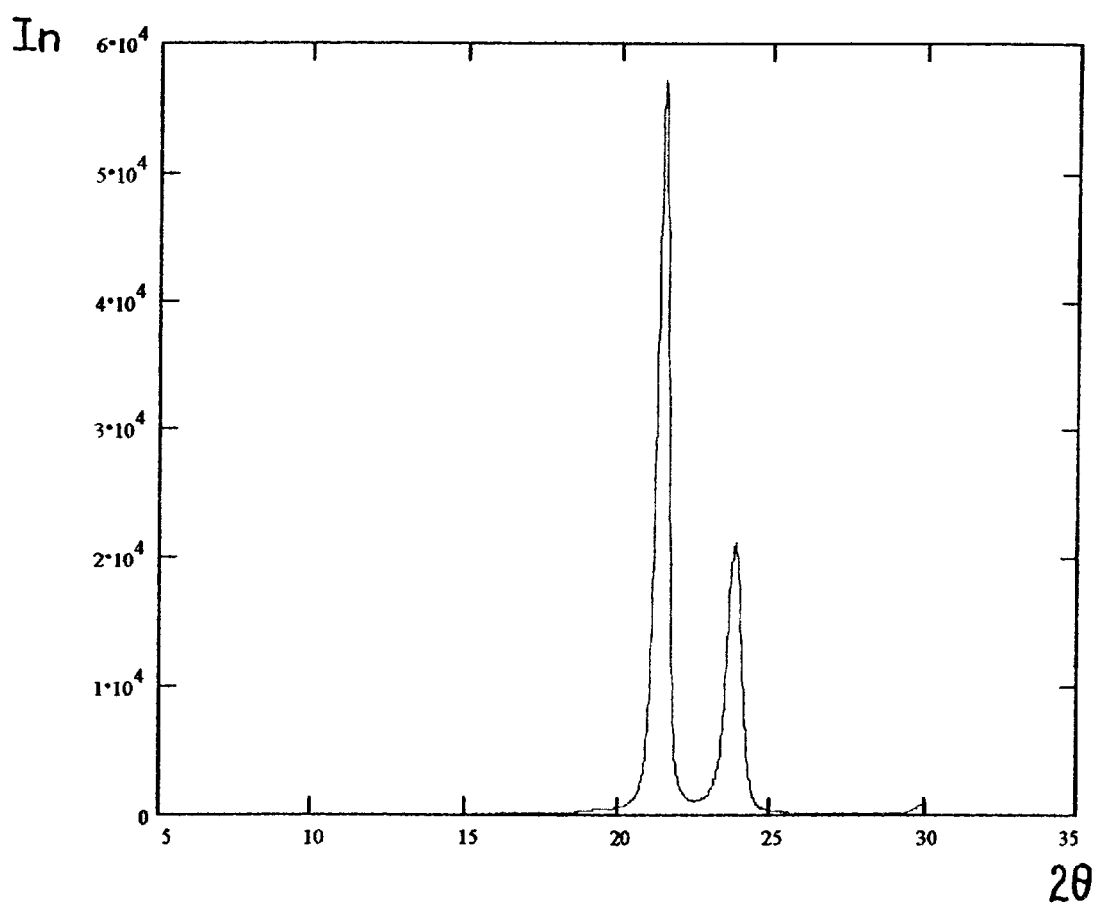
FIG. 6 is a transmission recording of an X-Ray diffractogram of a Pe1 sample. The crystal plane which is parallel to the sample plane is in the reflection position. In=intensity in photon number per second in absolute units as registered by the device; Q=2θ (Bragg's angle in degrees)
Figure 7A:
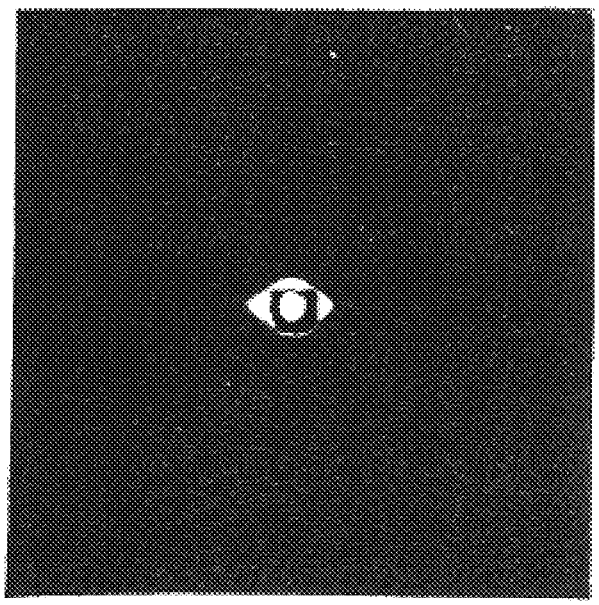
FIG. 7 shows small angle X-ray patterns from PE fiber (a) and composite Pe2 (b). The fibers were placed perpendicular to the visible line scattering.
Figure 7B:
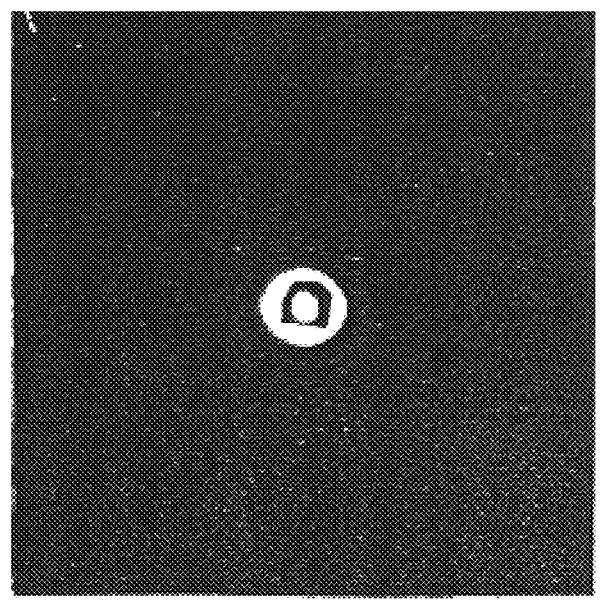
Figure 8:
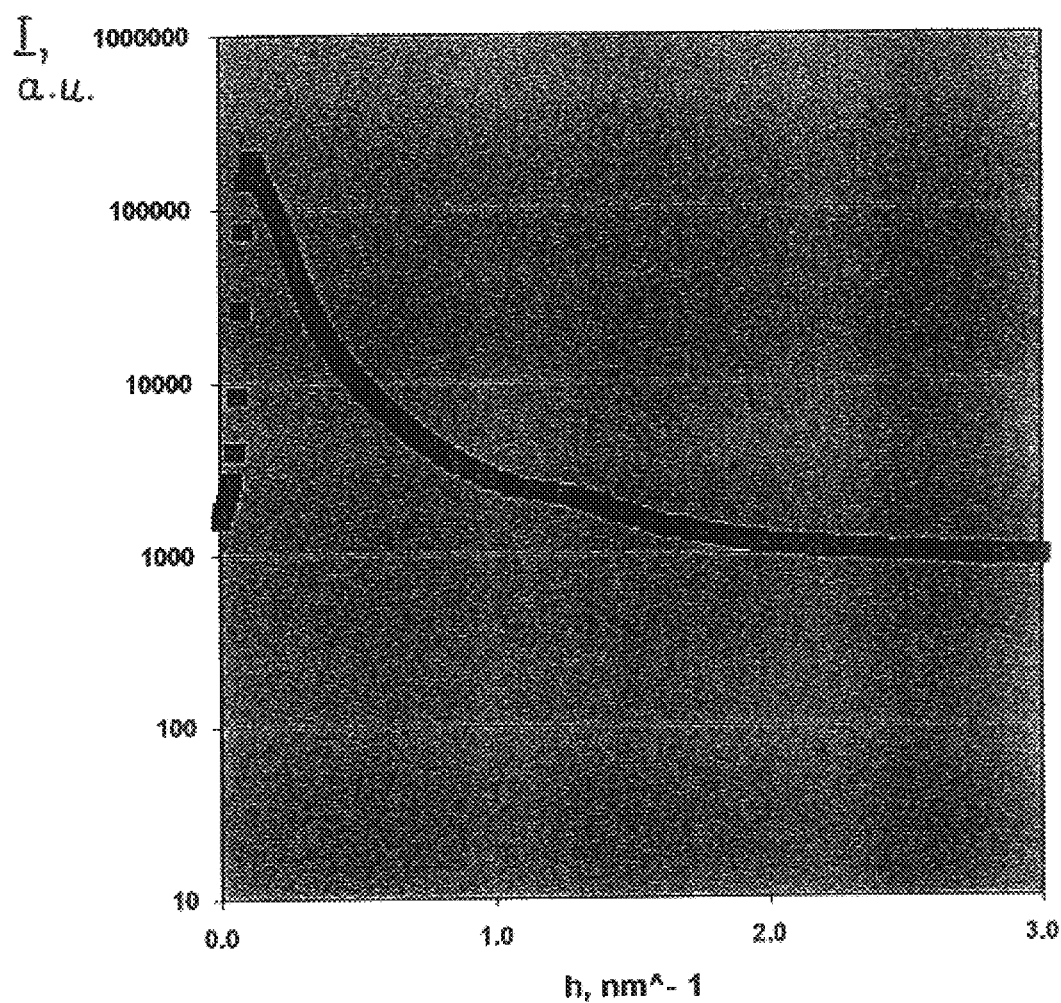
FIG. 8 shows small angle X-ray diffraction (SAXD) record of polyethylene fibers. Record was made in a direction parallel to the fibers orientation; I=scattering intensity in photon number per second in absolute units as registered by the device. $H=(2\pi \sin\theta/\lambda)$.
Figure 9A:
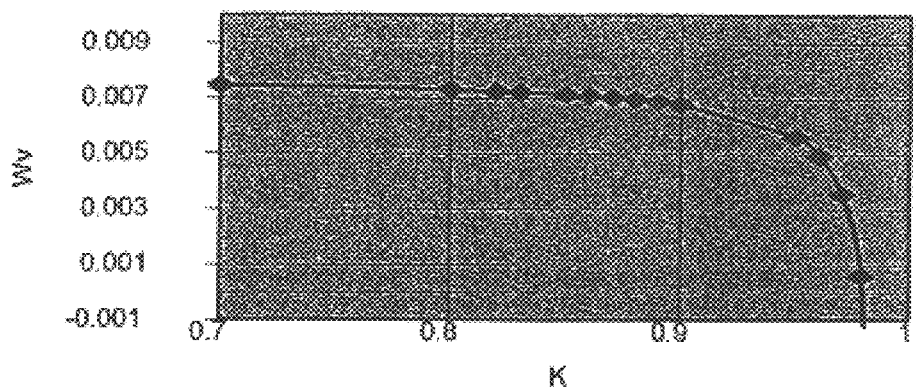
FIGS. 9a–c show the dependence of fiber features on cryatallinity (K) in relative units. Wv=voids part as a relative volume (a); Da=amorphous phase density; $W_a$=amorphous part; $W_k$=crystal part; $D_O$=fiber density=0.983 g/cm³. Volume part of voids (Wv) (a), Amorphous phase density (Da) (b) and Amorphous (Wa) and crystal (Wk) volume parts of fiber (c).
Figure 9B:
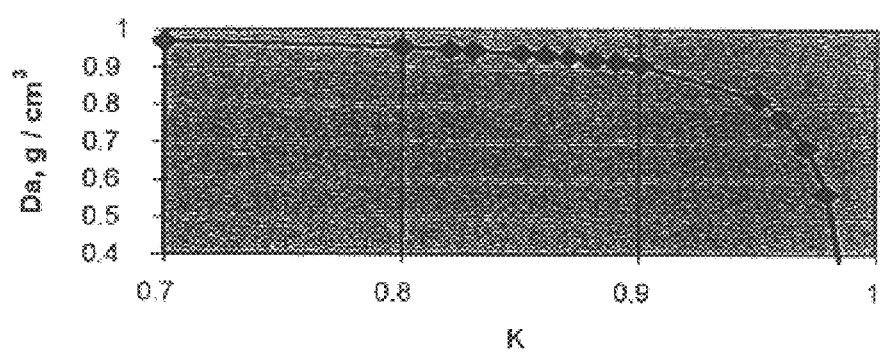
Figure 9C:
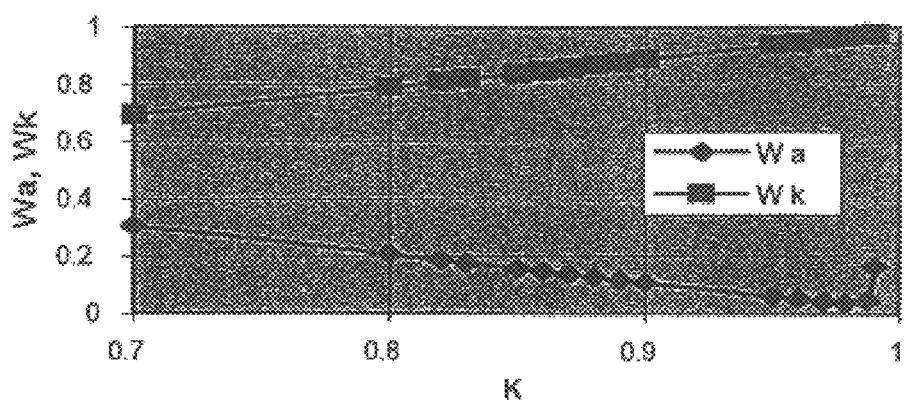
Figure 10A:
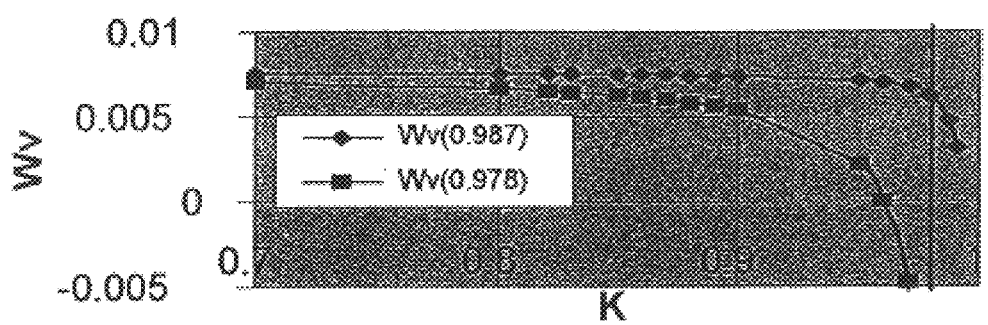
FIGS. 10a–c show the dependence of fiber features on crystallinity (K) in relative units and fiber density($D_O$). $W_v(D_O)$—Relative Volume part of voids (a); $D_a(D_O)$—amorphous phase density (b); $W_a(D_O)$—amorphous part and $W_k(D_O)$—crystal part of fiber volume (c); Margins of error for ($D_O$) measurement are shown. $W_v$=(Volume of voids)/(Total volume of sample); K=(Mass of crystalline phase)/(Total Mass)
Figure 10B:
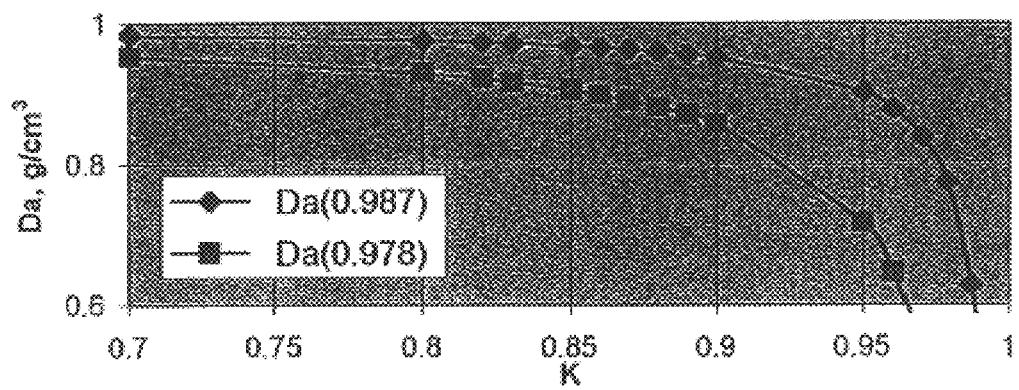
Figure 10C:
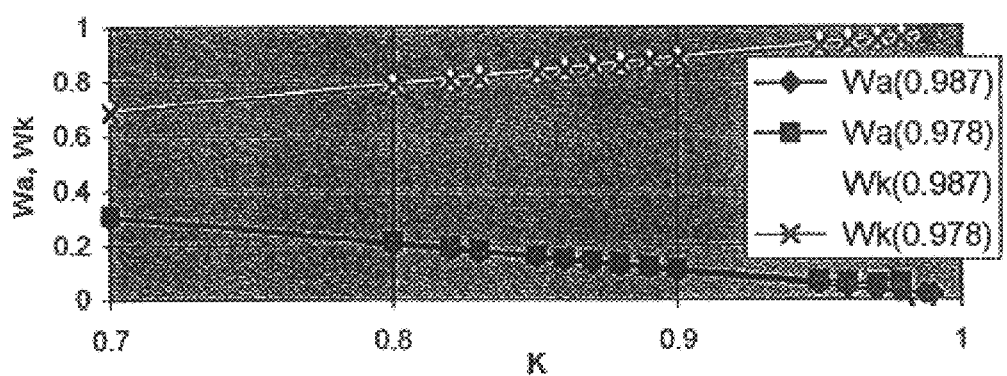
Figure 11A:
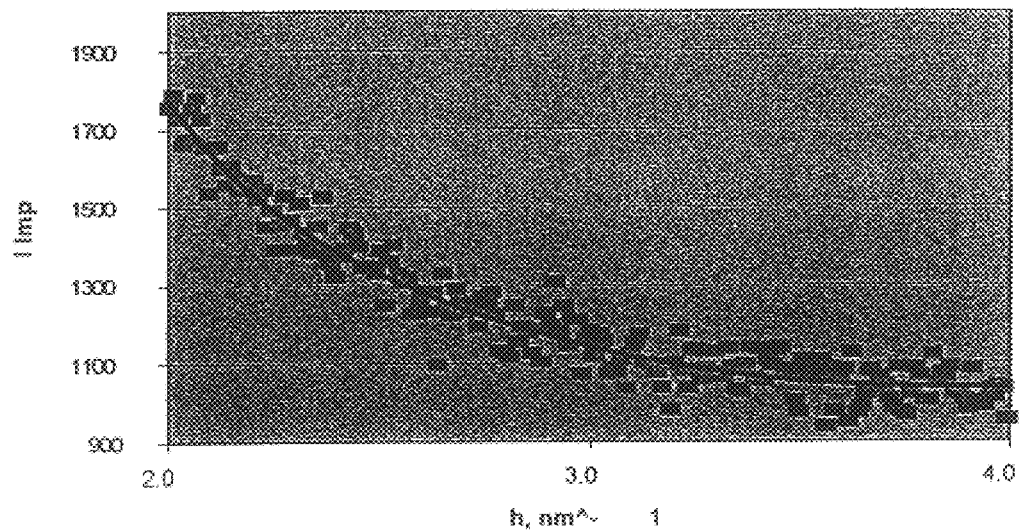
FIGS. 11a–b show small angle X-ray diffraction (SAXD) records of PE fibers (a) and of composite Pe2 (production process disclosed in Example 25) (b). Records were made in a direction perpendicular to the fibers orientation; I=scattering intensity. $H=(4\Pi \sin\theta)/\lambda$.
Figure 11B:
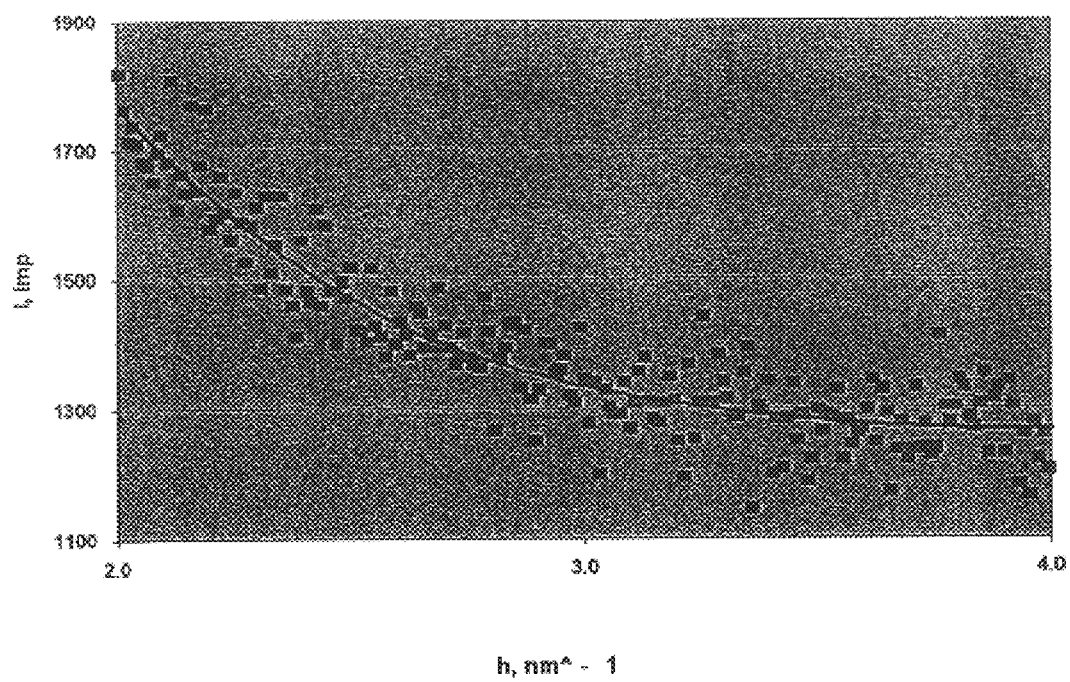
Figure 12:
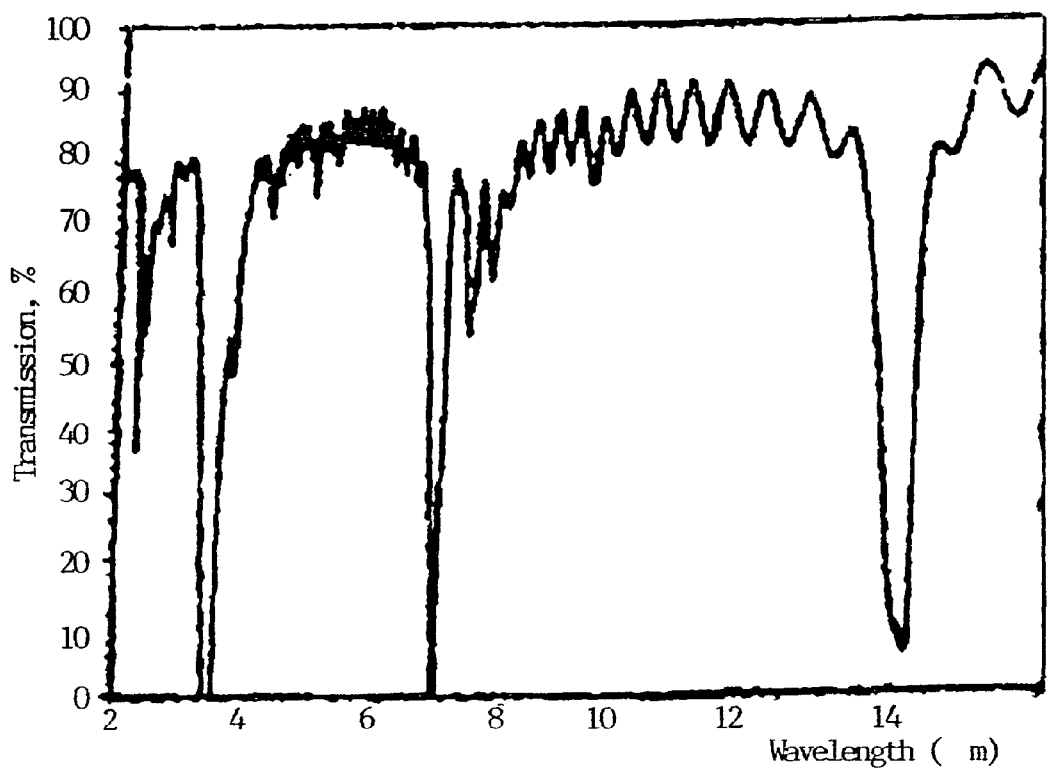
FIG. 12 shows transmission of infrared light with wavelengths from 2 to 14 microns through composite prepared according to the method of Example 16.

FIG. 2 shows a method of simultaneously applying vacuum and triaxial pressure. A contoured oriented fiber assembly 20 and a flexible blister 22 are placed between an upper section 24 and a lower section 26 of a press mold. Assembly 10 is heated and compressed by the insertion of hot pressurized oil 28 into blister 22 via an inlet 30. Upper section 24 and lower section 26 are held together against the pressure of oil 28 by wedges 32. Vacuum is applied to assembly 20 via ports 34a, 34b, 34c and 34d of a vacuum manifold 36.

At the end of the heating under pressure, a large amount of internal stress typically has been induced in the assembly. If the assembly is cooled too fast, the resulting sheet suffers from crazing. Preferably, the assembly is cooled at a rate of at most 2° C./minute. Most preferably, the assembly is cooled slowly enough so that it takes about 12 hours per centimeter of final assembly thickness to go from the processing temperature to ambient temperature.

The physical form of the thermo plastic starting material is preferably fibers, as described above, although the described manufacturing process may equally be applied to other physical forms of the thermoplastic polymer, such as, but not limited to, a powder, beads, a tape, chips, discs and the like. Regardless of the physical form of the starting material, an ultra high molecular weight plastic monolith results.

In those cases where the thermoplastic starting material is fiber, the resultant monolith is further characterized by voids which are super-oriented, needle-like, or both super-oriented and needlelike. These resultant monoliths may be further characterized by a high level of matrix orientation.

For purposes of this specification and the accompanying claims, the term super-oriented refers to voids which exhibit average deviations of parallelism between lengthwise axes of neighboring voids of less than 0.1 sterad (solid angle) as measured by X-ray diffraction.

Figure 14A:
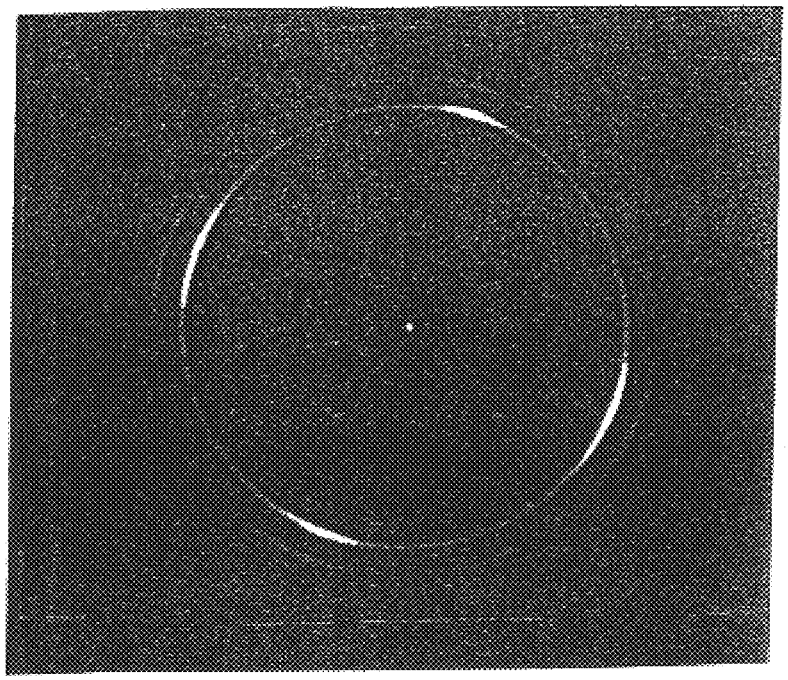

For purposes of this specification and the accompanying claims, the phrase "high level of matrix orientation" refers to the oriented matrix material that produces a wide angle X-ray diffraction pattern characterized by a disconnected ring in which the greatest part of the diffracted X-rays are concentrated into the less than 90° arcs that have the X-ray diffraction pattern equator and/or polar meridian as their bisector (for example, see FIGS. 14a, b).

For purposes of this specification and the accompanying claims, the terms "PE" and "UHMWPE" refer to polyethylene and ultrahigh molecular weight polyethylene, respectively.

For purposes of this specification and the accompanying claims the terms "composite" and "composite material" refer to a solid material resulting from the combination of two or more discrete substances, each with a separate set of characteristics, in order to create a new substance with properties superior to those of the discrete components of the original combination. Superiority of properties is evaluated with respect to at least one intended application.

For purposes of this specification and the accompanying claims the term "crystal" refers to any solid material in which the component atoms and/or molecules are arranged in a definite pattern and in which the surface regularity reflects this internal symmetry.

For purposes of this specification and the accompanying claims, the term "matrix" refers to that portion of the thermoplastic starting material which melts during the manufacturing process, and subsequently adheres to adjacent material upon cooling.

For purposes of this specification and the accompanying claims the phrase "needle like voids" refers to voids having an average aspect ratio (length:width) in the range of 5 to 50. Preferably the needlelike voids have an average width of 10–30 nm and an average length of 150–500 nm.

Super-oriented needle like voids are a distinguishing characteristic of some embodiments of the present invention, voids found in prior art products generally having a spherical or other rounded form. Super-oriented needlelike voids indicate that the monolith produced has retained of the strength typically associated with the fibers from which it is derived.

High level of matrix orientation is a distinguishing characteristic of some embodiments of the present invention, prior art products generally characterized by un-organized matrices. High level of matrix orientation indicates that the monolith produced has retained some of the strength typically associated with the fibers from which it is derived.

According to preferred embodiments of the present invention, it is possible to produce polymeric monoliths with thermal expansion coefficients (TEC) between −25 and +330 $10^{-6}$ ° C.[1]. This possibility derives from the unusual difference between the TEC inherent to UHMWPE fibers (−25 ($10^{-6}$° C.[1]) UHMWPE bulk matrix (+330($10^{6}$° $C^{-1}$) By using the method of the present invention, it is possible to precisely control the elastic modulus of the matrix material while exercising control over the fiber/matrix ratio and the fiber network density in each of axes X, Y and Z to manufacture composites which posses predetermined thermal expansion properties with respect to each of these axes.

For purposes of this specification and the accompanying claims, the terms "axis" and "axes" refer specifically to the X, Y and Z axes.

For purposes of this specification and the accompanying claims the "X axis" of a polymeric monolith is defined as a line in the plane of the monolith which bisects two opposite edges of the monolith. For curved monoliths, the X-axis resides in a plane tangential to the monolith at the point of measurement. For monoliths of non-uniform thickness, the X axis passes through the thinnest portion of the monolith.

For purposes of this specification and the accompanying claims the "Y axis" of a polymeric monolith is defined as a line in the plane of the monolith and perpendicular to the X axis. For curved monoliths, the Y-axis resides in a plane tangential to the monolith at the point of measurement together with the X axis.

For purposes of this specification and the accompanying claims the "Z axis" of a polymeric monolith is defined as a line perpendicular to the plane of the monolith and perpendicular to the X and Y axes. For curved monoliths, the Z-axis is perpendicular to a plane tangential to the monolith at the point of measurement which contains the X and Y axes.

For purposes of this specification and the accompanying claims, the phrase "varying the fiber network density" refers to the number of fibers per unit of length, and is understood to be independently measurable with respect to each of the three axes of a polymeric monolith.

For purposes of this specification and the accompanying claims the symbol "θ" refers to the Bragg's angle in degrees.

For purposes of this specification and the accompanying claims the symbol "λ" refers to the 0.154 nm, the wavelength of CuKa radiation.

For purposes of this specification and the accompanying claims the unit of measure for intensity and scattering intensity is number of photons per second as an absolute unit. All photons detected by the measuring device are counted.

According to preferred embodiments of the present invention it is possible to produce polymeric monoliths with predetermined TEC in each of the three axes X, Y and Z. In contrast to prior art teachings, which rely on regulation of the polymer/matrix ratio to obtain a desired thermal expansion capability ("rule of mixtures" ), the present invention teaches TEC control via changing the elastic modulus of the matrix material or by varying the fiber network density with respect to each of the three axes.

Figure 13A:
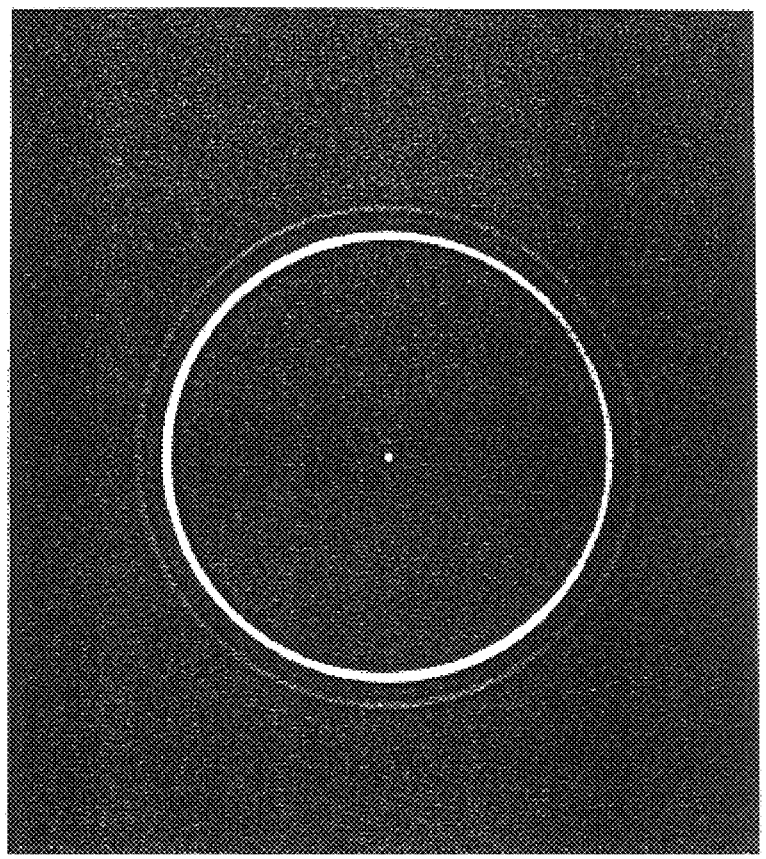
FIGS. 13a–b show wide angle (a) and small angle (b) X-ray diffraction patterns generated from one specific embodiment of the present invention expressly produced to have a thermal expansion coefficient (TEC) of 200×10⁻⁶° $C.^{-1}$.
Figure 13B:
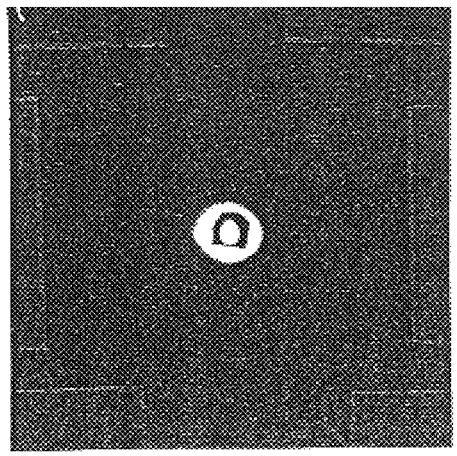
Figure 14B:
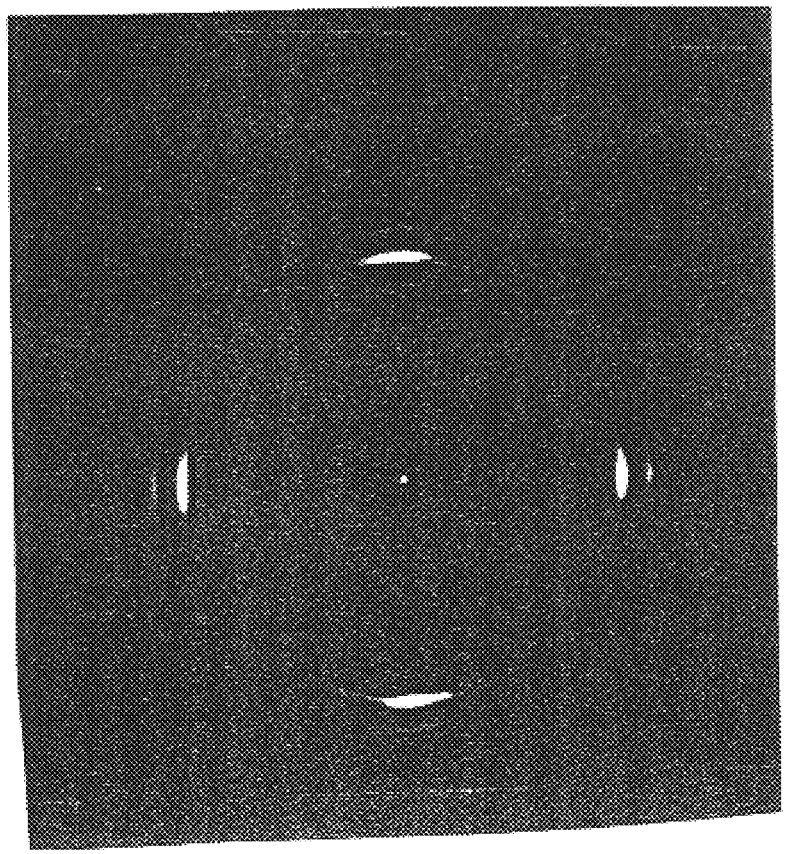

Pre-determining TEC by changing the elastic modulus of the matrix material while keeping the fiber/matrix ratio constant is feasible because the polymer material elastic modulus depends on its orientation. For example, the highly oriented UHMWPE fibers have a tensile elastic modulus of 170 GPa, while the non-oriented UHMWPE matrix possesses an elastic modulus of only 1.5 GPa. In addition, the TEC depends on material elastic modulus (Choy et al., "Elastic Constants and Thermal Expansivity of Gel Spun Polyethylene Fiber and its Composites", Polymer Composites 16(5): 387–381; formulas 11 and 12). As illustrated by FIGS. 13–15, the method of composite material manufacturing facilitates varying the matrix orientation in a wide range.

According to one preferred embodiment, control of TEC with respect to the Z axis may be realized by manufacturing the composite material from stapled (chopped) fibers of the necessary length, part of which may be preliminary oriented in the Z axes direction.

According to preferred embodiments of the present invention, detailed hereinbelow (see Example 23), materials without a sharp demarcation of mechanical properties on the fiber/matrix boundary may be obtained. In this case the TEC changes smoothly between fibers and matrix, eliminating thermal stresses in the composite and improving mechanical properties such as stability, shape stability and thermal tolerance across a broad range of temperatures.

According to additional preferred embodiments of the present invention, the fiber/matrix ratio influence on TEC may be used to independently control TEC for each of the three axes X, Y and Z. This control is realized by varying the fiber network density (i.e., number of fibers per unit of length) in each of axes X, Y and Z via the use of specially constructed fiber cloths, knitted fiber raw materials or fiber (or stapled fiber) non woven substances.

According to preferred embodiments of the present invention, strategies for controlling TEC of a plastic monolith described hereinabove may be used separately or in combination.

According to one preferred embodiment, a TEC of zero is chosen for the resultant polymeric monolith with respect to at least one of the axes X, Y or Z.

According to preferred embodiments of the present invention, the manufacturing process of the present invention produces a polymeric monolith containing more than 5% and less than 95% matrix, more preferably more than 5% and less than 70%, more preferably more than 5% and less than 30%, most preferably either more than 5% and less than 10% or more than 15% and less than 20% matrix.

According to preferred embodiments of the present invention, the polymeric monolith produced as a result of the manufacturing process has a matrix density in excess of 0.89 $g/cm^3$, preferably in excess of 0.93 $g/cm^3$, most preferably in excess of 0.93 $g/cm^3$ but preferably less than 1.03 $g/cm^3$.

For purposes of this specification and the accompanying claims, the term "kPsi" refers to thousands of pounds per square inch.

For purposes of this specification and the accompanying claims, the term "GPa" refers to $10^9$ Pascals which is equivalent to $10^9$ Newtons per square meter. The term "MPa" similarly refers to $10^6$ Pascals or $10^6$ Newtons per square meter which is equivalent to 0.1 $kg/mm^2$ and also equivalent to 145 pounds per square inch.

For purposes of this specification and the accompanying claims, the term ASTM refers to American System of Standards.

For purposes of this specification and the accompanying claims, the term "transparent" indicates more than 70% transmission of light within a defined wavelength or wavelength range.

For purposes of this specification and the accompanying claims, the terms Pe1 and Pe2 refer to specific products of manufacture produced by the method of the present invention. Pe1 and Pe2 are therefore examples of preferred embodiments of the present invention. Details of manufacture for Pe1, and Pe2 are disclosed in Examples 25 and 24 respectively.

As further detailed and exemplified in the Examples section that follows, it was found that the products of manufacture derived from PE fibers via the process of the present invention differ in their thermal properties, wide angle X-ray diffraction patterns and small angle X-ray diffraction pattern from products of manufacture created by processes taught by prior art. It was further found that X-ray diffractograms with different peak heights were obtained depending on the relative angle of the crystal plane to the sample plane, suggesting a high degree of orientation of the crystals. It was further found that volume part of voids, amorphous phase density and crystal volume were dependent upon crystallinity, as well as upon crystallinity and fiber density.

It was further found that by controlling inputs of heat and pressure, as disclosed in Example 16, it is possible to produce by the process of the present invention plastic sheets which are transparent to infrared light in critical wavelengths in the range of 1 to 12 microns.

Thus, according to preferred embodiments of the present invention, the resultant polymeric monoliths are transparent with respect to infrared light having a wavelength between 1 and 12 micrometers, more preferably) between 3 and 12 micrometers, most preferably either between 3 and 5 micrometers or between 8 and 12 micrometers.

According to preferred embodiments of the present invention, the resultant polymeric monoliths exhibit adhesive properties when welded or, partially melted, or preferably dissolved, which make joining without epoxy glue advantageous. These adhesive properties are present regardless of whether the polymeric monoliths are joined one to another, or to another material including, but not limited to, a metal, copper, for example.

EXAMPLES

The invention will now be described in more detail with reference to the following examples.

In Examples 1–6, the assembly of fibers was a scoured cloth of Dyneema™ 65 UHMWPE yarn produced by DSM corporation of the Netherlands. The weight of the yam was 440 dtex, in a 1×1 plain weave. In all cases, the rates of heating and cooling were 2° C./min.

The flexural modulus and the flexural yield strength of the sheets produced by the process were measured under the guidelines of ASTM D790. Density was measured by flotation in a water-alcohol mixture of controlled density. Ultrasound absorption was measured under the guidelines of ASTM D5300.

Example 1

(control)
(a) Apply 300 atm. of pressure. Heat to 153° C.
(b) Maintain at 300 atm. and 153° C. for 10 minutes.
(c) Maintain at 300 atm. while cooling to ambient temperature.

Example 2

(a) Apply 300 atm. of pressure. Heat to 153° C.
(b) Maintain at 300 atm. and 153° C. 9.5 minutes.
(c) Reduce pressure to 30 atm. Maintain at 30 atm. and 153° C. for 0.15 minutes.
(d) Maintain at 300 atm. while cooling to ambient temperature.

Example 3

(a) Apply 300 atm. of pressure. Heat to 153° C.
(b) Maintain at 300 atm. and 153° C. for 9.5 minutes.
(c) Reduce pressure to 30 atm. Maintain at 30 atm. and 153° C. for 0.25 minutes.
(d) Maintain at 300 atm. while cooling to ambient temperature.

Example 4

(a) Apply 300 atm. of pressure. Heat to 153° C.
(b) Maintain at 300 atm. and 153° C. for 9.85 minutes.
(c) Reduce pressure to 30 atm. Maintain at 30 atm. and 153° C. for 0.3 minutes.
(d) Maintain at 300 atm. while cooling to ambient temperature.

Example 5

(a) Apply 300 atm. of pressure. Heat to 153° C.
(b) Maintain at 300 atm. and 153° C. for 9.85 minutes.
(c) Reduce pressure to 30 atm. Maintain at 30 atm. and 153° C. for 0.5 minutes.
(d) Maintain at 300 atm. while cooling to ambient temperature.

The flexural moduli and optical properties of the resulting sheets were as follows:

| Example | Flexural Modulus (Gpa) | Flexural yield strength (Mpa) | Density (g/cm$^3$) | Appearance |
|---|---|---|---|---|
| 1 | 14 | 70 | 0.98 | opaque |
| 2 | 17 | 80 | 0.98 | translucent |
| 3 | 18 | 100 | 0.98 | translucent |
| 4 | 12 | 70 | 0.97 | translucent |
| 5 | 7 | 50 | 0.95 | translucent |

The opacity of Example 1 shows that the voids in the cloth had not been filled. The translucence of the other examples shows that at least all voids larger than about 0.2 microns had been filled. Note that because most of the void spaces were filled by mechanical deformation of the fibers, the optimal time for subsequent partial melting was only 0.25 minutes, considerably shorter than the 10 minute partial melting time in the examples of Ward et al. (U.S. Pat. No. 5,628,946). In any case, the partial melting time according to the present invention should be no more than about one minute.

The decreased density apparent in Examples 4 and 5 is due to an increased proportion of low-density amorphous material in these Examples.

Examples 1, 3 and 5 were subjected to further testing.

The proportion of the samples that consisted of oriented polymer was estimated from x-ray diffraction patterns. The diffraction patterns were obtained using a Ni-filtered CuKa radiation source (Phillips PW1730) operated at 40 kV and 30 MA, and a Warhus flat-film vacuum camera using Osray C film. The sample to film distance was 5 cm and the d-spacings were calibrated using alumina powder. The proportion of oriented polymer in Examples 1, 3 and 5 was 100%, 100% and 95% respectively.

Examples 1 and 3 were tested further for ultrasound and light absorption. Ultrasound absorption was measured under the guidelines of ASTM standard D5300. The absorption of ultrasonic energy by Example 3 was reduced by up to 6 db relative to Example 1. The absorption of red visible light by the monolith of Example 3 was reduced by up to 12 db relative to that of Example 1. These measurements demonstrate the increased homogeneity of the monolith of Example 3 relative to that of Example 1.

Example 6

To demonstrate the importance of slow cooling, a sixth sample was performed as in Example 3, but was allowed to cool freely instead of at a controlled rate. The resulting sheet was opaque and twisted, with visible microcrazes.

Examples 7–9 were intended to demonstrate the efficacy of the present invention in consolidating a fiber assembly with no solvent at all on the fibers. In all three of these Examples, the fiber assembly was Dyneema™ SK-75 yarn wound on a steel frame. The weight of |1760 dtex. After processing as described below, sheets dimensioned 20 cm×4 cm×0.5 cm were cut from the resulting monoliths for testing the strength of the sheets transverse to the yarn direction.

Example 7
(control)

The yarn was wound on the steel frame as received from the manufacturer, with residual solvent. The wound frame was subjected to a temperature of 151° C. and a pressure of 100 atm. for 20 minutes in a mold. The resulting sheet had a transverse strength of 15 Mpa. The rate of grip motion, as measured by an Instron testing machine, was 10 mm/min.

Example 8
(control)

As in Example 7, but prior to winding, the yarn was washed in a hexane bath for 5 hours to remove the residual solvent and then dried under vacuum. The washing and drying reduced the weight of the yarn by 1.5%, showing that the yarn of Example 7 included 1.5% residual solvent by weight. The resulting sheet had a transverse strength of 5.6 MPa. The rate of grip motion, as measured by an Instron testing machine, was 10 mm/min.

Example 9

The yarn was washed and dried as in Example 8 and wound on the steel frame. The wound frame was subjected to the following treatment:

(a) apply 100 atm. pressure and heat to 151° C. for about 60 minutes.
(b) reduce the pressure to 30 atm. for 4 seconds while maintaining the 151° C. temperature.
(c) while still maintaining the 151° C. temperature, increase the pressure back to 100 atm for about 5 seconds.

The pressure reduction to 30 atm. and subsequent increase to 100 atm. was repeated 4 times. The wound frame then was cooled to room temperature over a course of about 60 minutes (about 2° C. per minute) while still maintaining the 100 atm. pressure. The resulting sheet had a transverse strength of 17 Mpa. The rate of grip motion, as measured by an Instron testing machine. was 10 mm/min.

Example 10

Fabric UHMWPE fiber material from spectra yarn 1000 was subjected to the following treatment:

(a) set in several layers
(b) compressed under 800 atm. pressure at room temperature
(c) heated to 158° C.
(d) maintain temperature while reducing pressure to 200 atm for 10 minutes
(e) increase pressure to 800 atm. and cool to ambient temperature Example 11

Fabric UHMWPE fiber material from spectra yarn 1000 was subjected to the following treatment:

(a) set in several layers
(b) compressed under 800 atm. pressure at room temperature
(c) heated to 158° C.
(d) maintain temperature while reducing pressure to 200 atm. for 30 seconds
(e) increase pressure to 800 atm. for 30 seconds and cool to ambient temperature
(f) repeat (d) and (e) 20 times and reduce temperature to ambient temperature at 800 atm.

The resultant sheet had a TEC of $18 \times 10^{-6}$ °C.$^{-1}$ on the X and Y axes and was further characterized by flexural strength of 56 MPa.

Example 12

Fabric UHMWPE fiber material from spectra yarn 1000 was subjected to the following treatment:

(a) set in several layers
(b) compressed under 800 atm. pressure at room temperature
(c) heated to 156° C.
(d) maintain temperature while reducing pressure to 200 atm for 10 minutes
(e) increase pressure to 800 atm for 30 seconds and cool to ambient temperature
(f) repeat (d) and (e) 20 times and reduce temperature to ambient temperature at 800 atm The resultant sheet had a TEC of $18 \times 10^{-6}$ °C.$^{-1}$ on the X and Y axes and was further characterized by flexural strength of 56 MPa.

Example 13

Yarn was set on steel plates as in Example 8 and subjected to the following treatment: heated to 142° C. under pressure of 100 atm. unidirectional yarn was then layered at right angles (90°) to form a cross ply structure; pressed and heated as in example 10 (b) through (e). The resultant sheet had a TEC of $18 \times 10^{-6}$ °C.$^{-1}$ on the X and Y axes.

Example 14

Staple UHMWPE fiber material from Spectra yarn 1000 was subjected to the following treatment:

(a) mixed and compressed at 800 atm. at room temperature
(b) heated to 158° C.;
(c) reduce pressure to 200 atm. for 10 minutes.
(d) The resultant sheet had a TEC of $18 \times 10^{-6}$ °C.$^{-1}$ on X, Y and Z axes.

Example 15

Staple UHMWPE fiber material from Spectra yarn 1000 was subjected to the following treatment:

(a) mixed and compressed at 800 atm. at room temperature
(b) heated to 158° C.:
(c) reduce pressure to 200 atm. for 10 minutes;
(d) maintain temperature while reducing pressure to 200 atm. For 30 seconds
(e) increase pressure to 800 atm for 30 seconds The resultant sheet had a TEC of $18 \times 10^{-6}$ °C.$^{-1}$ on X, Y and Z axes.

Example 16

Single filaments of yarn Spectra 1000 was wound on steel plates as in Example 8 such that strands were parallel to one another with a distance of zero between strands and subjected to the following treatment:

(a) compressed at 100 atm. and 145° C. for 10 minutes;
(b) each pre-compressed layer was placed perpendicularly to a similar layer,
(c) compression at 400 atm and 158° C.
(d) reduce pressure to 100 atm over 5 minutes.

This process produced a thin translucent sheet with 70 μm thickness and a TEC of $15 \times 10^{-6}$ °C.$^{-1}$ on X, Y and Z axes.

Example 17

Single filaments of yarn Spectra 1000 was wound on steel plates as in Example 8 such that strands were parallel to one another with a distance of zero between strands and subjected to the following treatment:

(a) compressed at 100 atm. at room temperature;
(b) heated to 145° C. While maintaining 100 atm. for 10 minutes;
(c) cooled to room temperature at 100 atm.;
(d) each pre-compressed layer was placed perpendicularly to a similar layer;
(e) compression at 800 atm. at room temperature;
(f) heat to 158° C.;
(g) maintain at 158° C. while reducing pressure to 100 atm. for 30 seconds;
(h) increase pressure to 800 atm. for 30 seconds;
(i) repeat steps (g) and (h) 15 times and cool to ambient temperature while maintaining at 800 atm pressure.

This process produced a thin translucent sheet with 70 μm thickness and a TEC of $15 \times 10^{-6}$ °C.$^{-1}$ on X, Y and Z axes.

Additional articles of manufacture produced using the process of the present invention with varying inputs of heat and pressure are described in the following Examples.

Example 18

| A unidirectional composite (25% matrix): | | |
| --- | --- | --- |
| Mechanical property | value | units |
| Density | 0.98 | g/cm³ |
| Shear strength | 25 | MPa |
| Longitudinal tensile strength | 1500 | MPa |
| Elastic modulus (sonic) | 140 | GPa |
| Transverse tensile strength | 23 | MPa |
| Elongation at break (longitudinal) | 1.5 | % |
| Elongation at break (transverse) | 70 | % |

Example 19

| A cross ply composite (15% matrix): | | | |
| --- | --- | --- | --- |
| property | Test method | KPsi | GPa |
| Tensile modulus | ASTM D-638 | 10,900 | 77.0 |
| Tensile strength | ASTM D-882 | 145 | 1.0 |
| Compressive modulus | ASTM D-695 | 3,645 | 25.0 |
| Flexural modulus | ASTM D-790 | 5,160 | 35.0 |

Example 20

| A fabric based composite (less than 5% matrix): | | | |
| --- | --- | --- | --- |
| property | Test method | KPsi | GPa |
| Tensile modulus | ASTM D-638 | 11,200 | 77.0 |
| Flexural yield strength | ASTM D-822 | 13.9 | 0.1 |
| Compressive modulus | ASTM D-695 | 2,180 | 15.0 |
| flexural modulus | ASTM D-790 | 3,350 | 23.0 |

Example 21

| Shear strength of the junction of two composite sheets bonded together by various means: | | | |
| --- | --- | --- | --- |
| Bonding means | Test method | psi | MPa |
| Epoxy glue | ASTM D-638 | 660 | 5 |
| UHMWPE resin | ASTM D-638 | 740 | 5 |
| Glueless Welding | ASTM D-638 | 700 | 5 |

Example 22

| Peel strength of a 37 micron Copper foil laminated to a fabric based composite (PCB structure) | | | |
| --- | --- | --- | --- |
| Bonding means | Test method | Lbs./in | N/cm |
| Epoxy glue | ASTM D-903 | 9 | 16 |
| Glueless Welding | ASTM D-638 | 638 | 20 |

Example 23

In order to test the thermal stability of the composite material prepared in Example 12 (60 mm×15 mm×3 mm plate), the following protocol was instituted:

(a) immersion in liquid nitrogen for 5 minutes;
(b) immediate transfer to boiling water for 5 minutes;
(c) repetition of (a) and (b) 150 times.

Mechanical properties such as strength and elastic modulus were not affected by these repeated violent temperature changes. Shape of the plate remained unchanged according to measurements conducted with 0.001 mm tolerance. No cracks or other signs of intrinsic thermal stress were observed.

Example 24

Spectra yarn 1000 was wound on the steel frame and subjected to the following treatment:

(a) application of 400 atm. pressure followed by heating to 154° C.;
(b) reduce pressure to 40 atm. while maintaining 154° C. for 1 minute;
(c) increase pressure to 400 atm. and maintain pressure while cooling to ambient temperature.

Example 25

Spectra yarn 1000 was wound on the steel frame and subjected to the following treatment:

(a) application of 500 atm. pressure followed by heating to 153° C.;
(b) reduction of pressure to 50 atm. while maintaining 153° C. for 40 seconds;
(c) increase pressure to 500 atm. and maintain this pressure while cooling to ambient temperature.

It should be stressed that one skilled in the art may manipulate conditions of temperature, pressure and the times for which they are applied, in such a way as to produce articles of manufacture with a wide range of desired characteristics.

While the invention has been described with respect to a limited number of embodiments, it will be appreciated that many variations, modifications and other applications of the invention may be made.

What is claimed is:

1. A process for the production of a consolidated polymeric monolith from thermoplastic polymer, comprising the steps of:
   (a) forming an assembly of a thermoplastic polymer;
   (b) applying a pressure to said assembly sufficient to deform said thermoplastic polymer to substantially fill a majority of voids in said assembly, said assembly having a melting temperature at said deformation pressure;
   (c) heating said assembly to a temperature below said melting temperature but at which said assembly would at least partly melt at a transition pressure lower than said deformation pressure; and
   (d) subsequently reducing said applied pressure to said transition pressure while maintaining said assembly at said temperature for a time sufficient for said assembly to at least partly melt, thereby substantially filling a remainder of said voids.

2. The process of claim 1, wherein a physical form of said thermoplastic polymer is selected from the group consisting of a fiber, a powder, beads, a tape, chips, and discs.

3. The process of claim 1, wherein said pressure and said heat are employed to determine a specific thermal expansion coefficient of the resultant product.

4. The process of claim 1, further comprising the step of:
   (e) subsequent to said reduction of said applied pressure to said transition pressure, increasing said applied pressure to a consolidation pressure at least about as great as said deformation pressure while maintaining said assembly at said temperature.

5. The process of claim 3, wherein said reducing of said pressure to said transition pressure and said subsequent increasing of said pressure to said consolidation pressure while maintaining said assembly at said temperature are effected at least twice.

6. The process of claim 5, wherein changes from said transformation pressure to said consolidation pressure, and from said consolidation pressure to said transformation pressure occur with a frequency greater than 0.001 Hz but less than 0.5 Hz.

7. The process of claim 3, wherein said assembly is maintained at said transition pressure for at most about one minute before said increasing of said applied pressure to said consolidation pressure.

8. The process of claim 3, further comprising the step of:
   (f) subsequent to said increasing of said applied pressure to said consolidation pressure, maintaining said assembly at said consolidation pressure while cooling said assembly.

9. The process of claim 8, wherein said cooling continues until said assembly is at ambient temperature.

10. The process of claim 8, wherein said cooling to ambient temperature is prolonged for at least 12 hours per centimeter of final thickness of said assembly.

11. The process of claim 7, wherein said cooling is effected at a rate of at most about 2° C. per minute.

12. The process of claim 1, wherein said assembly is maintained at said temperature and at said transition pressure for at most about one minute.

13. The process of claim 1, wherein said pressures are applied uniaxially.

14. The process of claim 1, wherein said pressures are applied triaxially.

15. The process of claim 1, further comprising the step of:
   (e) applying vacuum to said assembly during at least part of said application of said pressures.

16. The process of claim 1, further comprising the step of:
   (e) treating said assembly with a solvent to swell said thermoplastic polymer before said application of said pressure.

17. The process of claim 16, wherein said swelling of said thermoplastic polymer continues during said application of said pressure.

18. The process of claim 1, further comprising the step of:
   (e) treating said assembly with a solution of said polymer to swell said thermoplastic polymer before said application of said pressure.

19. The process of claim 18, wherein said swelling of said thermoplastic polymer continues during said application of said pressure.

20. The process of claim 1, wherein said deformation pressure is sufficient to deform the thermoplastic polymer to substantially fill substantially all said voids.

21. The process of claim 3, wherein said thermal expansion coefficient is determined independently for each of the 3 axes X, Y, and Z.

22. An article of manufacture made by the process of claim 1.

23. A consolidated polymeric monolith comprising a matrix of thermoplastic polymer wherein the density of said matrix exceeds 0.89 g/cm$^3$.

24. The monolith of claim 23, wherein the density of said matrix exceeds 0.93 g/cm$^3$.

25. The monolith of claim 24, wherein the density of said matrix is in the range of 0.93 g/cm$^3$ to 0.99 g/cm$^3$.

26. A consolidated polymeric monolith comprising a matrix of thermoplastic polymer, further comprising superoriented voids therein, said voids exhibiting average deviations of parallelism between lengthwise axes of neighboring voids of less than 0.1 sterad (solid angle) as measured by X-ray diffraction.

27. The consolidated polymeric monolith of claim 26, wherein said voids have an average width within a range of 10–30 nm.

28. The consolidated polymeric monolith of claim 26, wherein said voids have an average length within a range of 150 to 500 nm.

29. The consolidated polymeric monolith of claim 26, wherein said voids have an average aspect ratio (length:width) of between 5 and 50.

30. The consolidated polymeric monolith of claim 26, further comprising super-oriented voids contained therein, said voids exhibiting average deviations of parallelism between lengthwise axes of neighboring voids of less than 0.1 sterad (solid angle) as measured by X-ray diffraction.

31. The consolidated polymeric monolith of claim 23, further comprising super-oriented voids contained therein, said voids having an average width within a range of 10–30 nm.

32. The consolidated polymeric monolith of claim 23, furthers comprising, super-oriented voids contained therein, said voids having an average length within a range of 150 to 500 nm.

33. The consolidated polymeric monolith of claim 23, further comprising super-oriented voids contained therein, said voids having an average aspect ratio (length:width) of between 5 and 50.

34. The consolidated polymeric monolith of claim 23, further comprising super-oriented voids contained therein.

35. The consolidated polymeric monolith of claim 23, further comprising super-oriented voids contained therein, said voids having an average width within a range of 10–30 nm, said voids further having an average length within a range of 150 to 500 nm such that the average aspect ratio (length:width) of said voids is between 5 and 50, said voids further exhibiting average deviations of parallelism between lengthwise axes of neighboring voids of less than 0.1 sterad (solid angle) as measured by X-ray diffraction.

36. The consolidated polymeric monolith of claim 23, further comprising super-oriented voids wherein the deviations of parallelism between lengthwise axes of one of said voids and at least one neighboring void are less than 0.1 sterad (solid angle).

37. The consolidated polymeric monolith of claim 23, further comprising a high level of matrix orientation wherein the oriented matrix material produces a wide angle X-ray diffraction pattern characterized by a disconnected ring in which the greatest part of the diffracted X-rays are concentrated into the less than 90° arcs that have the X-ray diffraction pattern equator and/or polar meridian as their bisector.

38. The consolidated polymeric monolith of claim 23, further comprising more than 5% and less than 95% matrix material.

39. The consolidated polymeric monolith of claim 23, further comprising more than 10% and less than 70% matrix material.

40. The consolidated polymeric monolith of claim 23, further comprising more than 14% and less than 30% matrix material.

41. The consolidated polymeric monolith of claim 23, further comprising more than 15% and less than 20% matrix material.

42. The consolidated polymeric monolith of claim 23, further comprising more than 5% and less than 15% matrix.

43. The consolidated polymeric monolith of claim 23, further comprising more than 5% and less than 10% matrix.

44. The consolidated polymeric monolith of claim 23, having a thermal expansion coefficient greater than 25 but less than 330 $10^{-6°}$ $C.^{-1}$.

45. The consolidated polymeric monolith of claim 44, wherein the desired predetermined thermal expansion coefficient is obtained by changing the elastic modulus of the matrix material while keeping the fiber/matrix ratio constant.

46. The consolidated polymeric monolith of claim 42, further including increased stability in the presence of thermal stress, said thermal stress being in the form of rapid and repeated fluctuation between any temperatures in the range of −160° C. and +100° C.

47. The consolidated polymeric monolith of claim 44, wherein the desired thermal expansion coefficient for each of the three axes X, Y and Z is determined independently for each of said axes by controlling the fiber network density in each of said axes X, Y and Z.

48. The consolidated polymeric monolith of claim 44, wherein there is one thermal expansion coefficient for two axes and a different thermal expansion coefficient for the third axis.

49. The consolidated polymeric monolith of claim 44, wherein there is a distinct thermal, expansion coefficients for each of the three axes.

50. The consolidated polymeric monolith of claim 44, wherein a thermal expansion coefficient of zero with respect to at least one axis is achieved.

51. The consolidated polymeric monolith of claim 44, wherein an infrared light beam is 70 to 100% transmissible there through.

52. The consolidated polymeric monolith of claim 51, wherein the thickness of said monolith is equal to two diameters of a fiber employed as a starting material.

53. The consolidated polymeric monolith of claim 51, wherein said infrared light beam has a wavelength between 1 and 12 microns.

54. The consolidated polymeric monolith of claim 53, wherein said infrared light beam has a wavelength between 3 and 12 microns.

55. The consolidated polymeric monolith of claim 54, wherein said infrared light beam has a wavelength between 3 and 5 microns.

56. The consolidated polymeric monolith of claim 54, wherein said infrared light beam has a wavelength between 8 and 12 microns.

57. The consolidated polymeric monolith of claim 23, wherein joining two of said monoliths by glueless welding gives a bonding strength not less than a bonding strength given by joining said monoliths with epoxy glue.

58. The consolidated polymeric monolith of claim 23, wherein joining two of said monoliths by UHMWPE resin gives a bonding strength not less than a bonding strength given by joining said monoliths with epoxy glue.

59. The consolidated polymeric monolith of claim 23, wherein joining said monoliths to another surface by glueless welding gives a bonding strength not less than a bonding strength given by joining said monoliths with epoxy glue.

* * * * *